(12) United States Patent
Tsengas

(10) Patent No.: US 9,345,233 B1
(45) Date of Patent: May 24, 2016

(54) COMPOSITE CLAW SCRATCHER

(71) Applicant: OurPet's Company, Fairport Harbor, OH (US)

(72) Inventor: Steven Tsengas, Fairport Harbor, OH (US)

(73) Assignee: OURPET'S COMPANY, Fairport Harbor, OH (US)

( * ) Notice: Subject to any disclaimer, the term of this patent is extended or adjusted under 35 U.S.C. 154(b) by 0 days.

(21) Appl. No.: 14/807,733

(22) Filed: Jul. 23, 2015

Related U.S. Application Data

(63) Continuation-in-part of application No. 13/151,611, filed on Jun. 2, 2011, now abandoned, and a continuation-in-part of application No. 13/738,089, filed on Jan. 10, 2013, now abandoned, and a continuation-in-part of application No. 13/929,851, filed on Jun. 28, 2013.

(60) Provisional application No. 62/028,837, filed on Jul. 25, 2014.

(51) Int. Cl.
*A01K 15/02* (2006.01)
*A01K 29/00* (2006.01)

(52) U.S. Cl.
CPC .................................. *A01K 15/024* (2013.01)

(58) Field of Classification Search
CPC . A01K 15/024; A01K 15/025; A01K 15/027; A01K 13/004
USPC .................. 119/706, 702, 707, 708; D30/160
See application file for complete search history.

(56) References Cited

U.S. PATENT DOCUMENTS

| | | | | |
|---|---|---|---|---|
| 3,486,485 A * | 12/1969 | Kahanick | ............. | A01K 15/024 119/706 |
| 3,993,027 A * | 11/1976 | Mullin | ................. | A01K 15/024 119/706 |
| 5,842,440 A * | 12/1998 | Bell, Jr. | ................ | A01K 15/024 119/612 |
| 5,875,737 A * | 3/1999 | Boshears | ............. | A01K 15/025 119/706 |
| 6,021,741 A * | 2/2000 | Krietzman | ........... | A01K 15/024 119/706 |
| D555,843 S * | 11/2007 | Lika | ............................. | D30/160 |
| D557,464 S * | 12/2007 | Novak | ........................ | D30/160 |
| 7,647,893 B2 * | 1/2010 | Kraus | .................. | A01K 1/0356 119/702 |
| D648,080 S * | 11/2011 | Haaf | ............................ | D30/160 |
| 8,141,519 B2 * | 3/2012 | Salzman | ................ | A01K 1/033 119/482 |
| 8,327,806 B2 * | 12/2012 | Haaf | ..................... | A01K 15/024 119/706 |
| 8,561,575 B2 * | 10/2013 | Ruffin | ................... | A01K 15/024 119/706 |
| 8,578,890 B1 * | 11/2013 | Haaf | ..................... | A01K 15/024 119/706 |
| 2002/0189549 A1 * | 12/2002 | Writer | .................. | A01K 15/024 119/706 |
| 2004/0139926 A1 * | 7/2004 | Diep | ...................... | A01K 15/024 119/601 |
| 2006/0042560 A1 * | 3/2006 | Novak | ................. | A01K 15/024 119/706 |
| 2006/0137623 A1 * | 6/2006 | Lamstein | .............. | A01K 15/024 119/706 |
| 2008/0295782 A1 * | 12/2008 | Ebert | .................... | A01K 15/024 119/706 |
| 2010/0122665 A1 * | 5/2010 | Delzio | ................. | A01K 15/024 119/706 |
| 2012/0204808 A1 * | 8/2012 | Shenefelt | ............. | A01K 15/027 119/706 |
| 2012/0279458 A1 * | 11/2012 | Haaf | ..................... | A01K 15/024 119/706 |
| 2014/0014043 A1 * | 1/2014 | McCann | ............... | A01K 15/024 119/706 |

* cited by examiner

*Primary Examiner* — Yvonne Abbott-Lewis
(74) *Attorney, Agent, or Firm* — John D. Gugliotta

(57) ABSTRACT

A combination claw scratcher product for domestic pets with a scratching surface that includes a textured surface and a cork-catnip composite material surface created by being molded, compressed, extruded or similarly processed into small or large bodies or sheets and allow for the economic manufacture of said combination claw scratcher product. The cork-catnip composite material surface allows for the delivery of an aromatic attractant for encouraging pet interaction, low manufacture cost for the product and longer life of the product.

10 Claims, 4 Drawing Sheets

COMPOSITE CLAW SCRATCHER

RELATED APPLICATIONS

The present invention claims the benefit of U.S. Provisional Patent Ser. No. 62/028,837 filed on Jul. 25, 2014. The present application is a Continuation in Part of U.S. Ser. No. 13/151,611 filed on Jun. 2, 2011 and U.S. Ser. No. 13/738,089 filed on Jan. 10, 2013, both of which are incorporated by references as if fully rewritten herein. The present application further incorporates by reference teachings first presented in U.S. Ser. No. 13/929,851, filed on Jun. 28, 2013.

BACKGROUND OF THE INVENTION

1. Field of the Invention

The present invention relates generally to apparatuses, systems and methods for dulling animal claws and, more particularly, to a combination claw scratcher product for domestic pets with a scratching surface that includes a textured surface and a cork-catnip composite material surface incorporated as an attractant to encourage use.

2. Description of the Related Art

Domesticated animals often exhibit the traits and behaviors of their feral counterparts. One of the most common being scratching, particularly with respect to domesticated cats. There are a myriad of reason for animals to exhibits scratching behavior including: communicating dominance to other animals, removing the dead outer layer of the claws, marking their territory, and stretching and flexing.

Scratching is a normal behavior that domesticated pets must be allowed to exhibit, but it is also not a desirable behavior to pet owners. If a dedicated scratching surface is not provided, domestic cats will generally satisfy their need to scratch by turning to furniture, curtains and other articles which can be substantially damaged as a consequence. Most pets choose textured surfaces to scratch, such as carpets or furniture, and the scratching tends to damage these surfaces. For this reason, pet products have been developed to provide substitute scratching surfaces for domesticated pets prone to scratching.

Part of the challenge in replacing a pet's scratching surface with a pet product designed for scratching is making the pet product attractive or enticing to the pet. For this purpose, many of the available pet products may use or incorporate an attractant, such as *Nepeta cataria*, commonly known as catnip, catswort or catmint, into the product to encourage pet interaction with said product.

*Nepeta cataria*, commonly known as catnip, or catswort or catmint, is a herbaceous perennial, resembling a mint in appearance, that is widely naturalized elsewhere, as well as commercially grown for specialty purposes. It is commonly used in herbal tea blends related to sleep, stress reduction, and relaxation, as well as used as a culinary herb for cooking and many dishes.

The plant terpenoid nepetalactone is the main chemical constituent of the essential oil of *Nepeta cataria* (and some other species within the genus *Nepeta*). This essential oil is known for their behavioral effects on the cat family, and especially on domestic cats. Nepetalactone acts as the behavioral attractant, with the chemical entering the feline's nose and stimulating the olfactory receptors. Other plants that also have this effect on cats include valerian (*Valeriana officinalis*) and plants that contain actinidine.

Used as a recreational substance for pet cats' enjoyment, catnip and catnip-laced products are designed for use with domesticated cats and are available to consumers. Used generally as an attractant to encourage play and interaction, catnip commonly causes domesticated felines to rub on the plant, roll on the ground, pawing at it, licking it, and chewing it. Consuming catnip is often followed by drooling, sleepiness, anxiety, leaping about and purring.

There are many pet products available that incorporate these effects to provide entertainment to the pet and the owner. The most direct method of forming such products is to compress chopped catnip material directly into the shape of a desired product itself. For example, U.S. Pat. No. 1,022,113, issued in the name of Smith, speaks to a ball made entirely of compressed catnip is described, as well as a ball formed of wood, rubber, papier-mâché or wood pulp pressed into a shape and formed with recesses that are filled with catnip compound. More recently, numerous design patents exist for compressed catnip pet toys formed into various shapes.

Such products are popular for their efficacy, but the cost of the plant material results in only small sized devices being commercially available. Products made entirely of compressed catnip are therefore costly to produce and there exists a need for products that can incorporate catnip in a more cost-effective way. Additionally, the small sized devices limit the amount of catnip used and with a limited amount of catnip, the catnip is rapidly used up thereby significantly diminishing the appeal of the device to a domestic pet. As a result, the life of the device is considerably reduced. Thus, there exists a need for a product that is low cost and durable with a longer lasting appeal to a domestic pet thereby extending the life of the product.

Currently, extending the life of a device of this type requires that the catnip used in such devices be replaced or refilled. As such, these devices often provide for the replenishment of catnip, either in the form of solid or liquid extract, into or within the toy for subsequent dispensing based on movement or rotation of the toy or its interaction with the surrounding air. The present invention is markedly different by providing in combination a claw scratcher product for domestic pets with a scratching surface that includes a textured surface and a cork-catnip composite material surface incorporated as an attractant that is a less expensive aromatic composite material in that it can be molded, compressed, extruded, or otherwise shaped into a planar surface economically for extended delivery of an effective rate of aromatic compounds efficacy thereby providing for a longer life of the device that incorporates the composite material.

SUMMARY OF THE INVENTION

The present invention provides a material incorporated into the product surface that has a long lasting, positive aroma for domestic pets that encourages use and interaction.

Further, the present invention provides a hydrophobic, naturally mold resistant, nontoxic material incorporated into the product surface to encourage the interest of the domestic pet in the product itself.

It is an object of the present invention to provide a claw scratcher product that is long lasting, durable, and low in production cost.

It is another object of the present invention to provide for use of durable, warm, soft, skid resistant and resilient material for use in conjunction with domestic pet products that is formed substantially of natural ingredients.

It is yet another object of the present invention to provide for the use of a catnip composite material that results in a soft, textured "feel" that can be grasped, clawed or chewed in a manner that is positively received by domestic pets.

It is still yet another object of the present invention to provide a claw scratcher product that is enticing to domestic pets and remains enticing even after extensive use.

Therefore, it is an object of the present invention to include a catnip composite material.

It is another object of the present invention to provide a scratching device incorporating a catnip composite material capable of being molded, compressed, extruded or otherwise shaped into small or large sheets of aromatic attractant material.

This, among other disclosed advantages and features, overcomes many of the deficiencies outlined and inherent within the known prior art.

Briefly described according to one embodiment of the present invention, a scratching surface is provided that includes a textured surface and a cork-catnip composite material surface, created by being molded, compressed, extruded or similarly processed into small or large bodies or sheets and allow for the economic manufacture of said combination claw scratcher product. The cork-catnip composite material surface allows for the delivery of an aromatic attractant for encouraging pet interaction, low manufacture cost for the product and longer life of the product. As described in one embodiment of the present invention, a catnip-cork composite material is provided that is capable of being molded, compressed, extruded or similarly processed into small or large bodies or sheets and allow for the economic manufacture of toys and products for domestic pets, especially felines. Dried and granulated catnip (or similar olfactory attractant) is blended with a fill material such as powdered or granulated agglomerate cork material that is typically a waste product of cork stopper manufacturing. It is envisioned that similar materials can be alternately used, such as, for example, waste cedar wood shavings or sawdust or other types of lignocellulose material. The use of various types of low cost waste products or woody biomass materials have been found to effectively extend the economic viability of the compression molded catnip products available in the prior art. The blended chipped, granulated or powdered materials are then mixed with a bonding agent. An effective bonding agent has been found in the use of lignosulfates. Lignosulfates can also be obtained as a recovered waste product from the wood or paper pulping industries, and further will make the completed product of an "all-natural" construction. Other effective bonding agents are known and can be used, for example, polyurethane food grade adhesives.

As described above, a low cost, all-natural (or substantially natural) composite material can be formed economically into various shapes. Given the economy of using a composite material whose components have an overall lower blended cost than a material made substantially of 100% molded catnip, it is now possible to make affordable, longer lasting claw scratcher products, that provide the attractant benefit to the domestic feline of catnip.

The foregoing and other aspects will become apparent from the following detailed description of the invention when considered in conjunction with the accompanying drawing figures.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

It should be understood that the composite material of the present invention can be formed through a number of extrusion or compression methods to be adapted to various sizes and thicknesses, and that the present disclosure is intended to describe preferred embodiments of the present invention.

DESCRIPTION OF THE PREFERRED EMBODIMENTS

Before explaining the present invention in detail, it is important to understand that the invention is not limited in its application to the details of the construction illustrated and the formulations described herein. The invention is capable of other embodiments and of being practiced or carried out in a variety of ways. It is to be understood that the phraseology and terminology employed herein is for the purpose of description and not of limitation.

1. Detailed Description of the Figures

Figure 1:
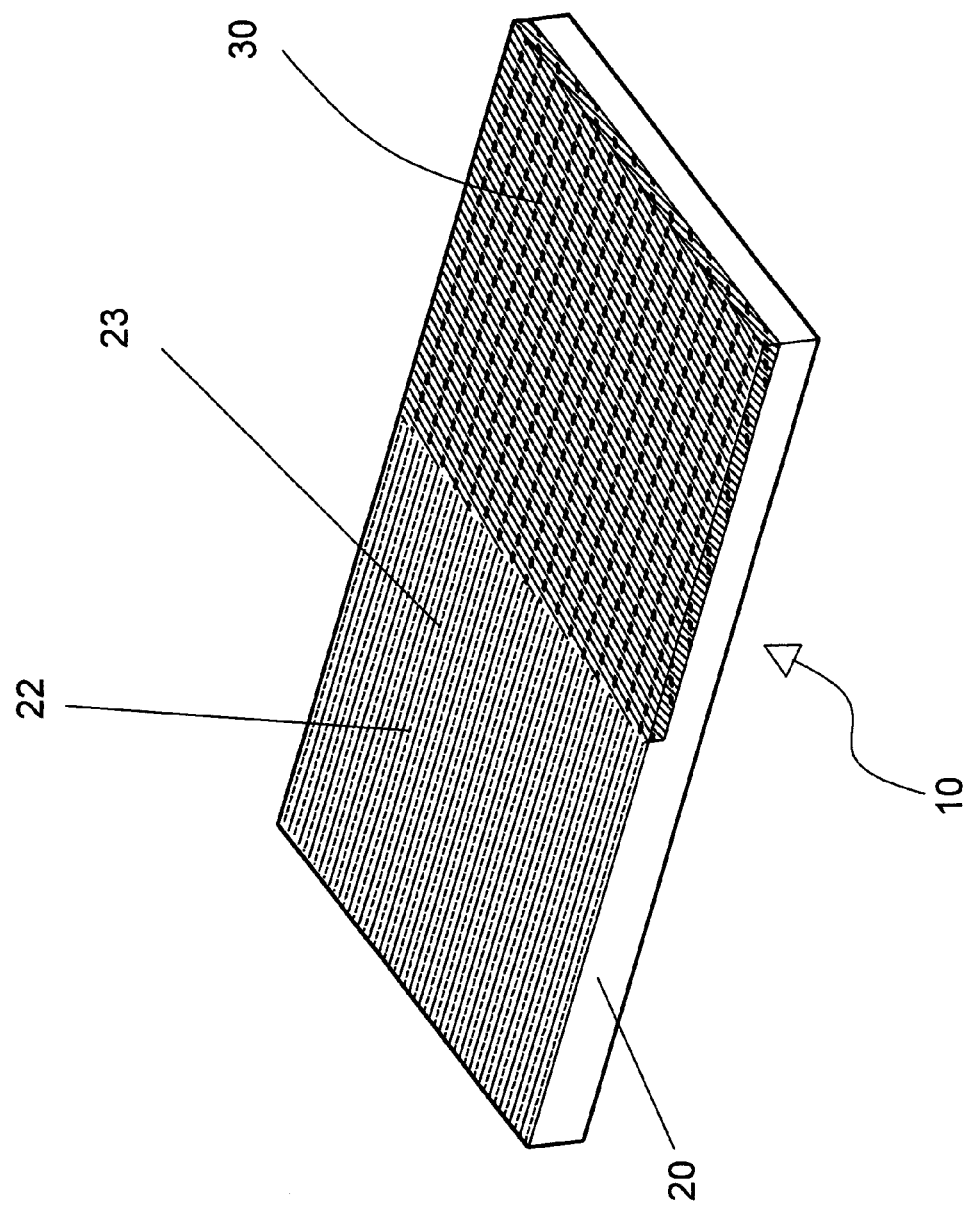
FIG. 1 is a perspective view of a combination claw scratcher.
Figure 2:
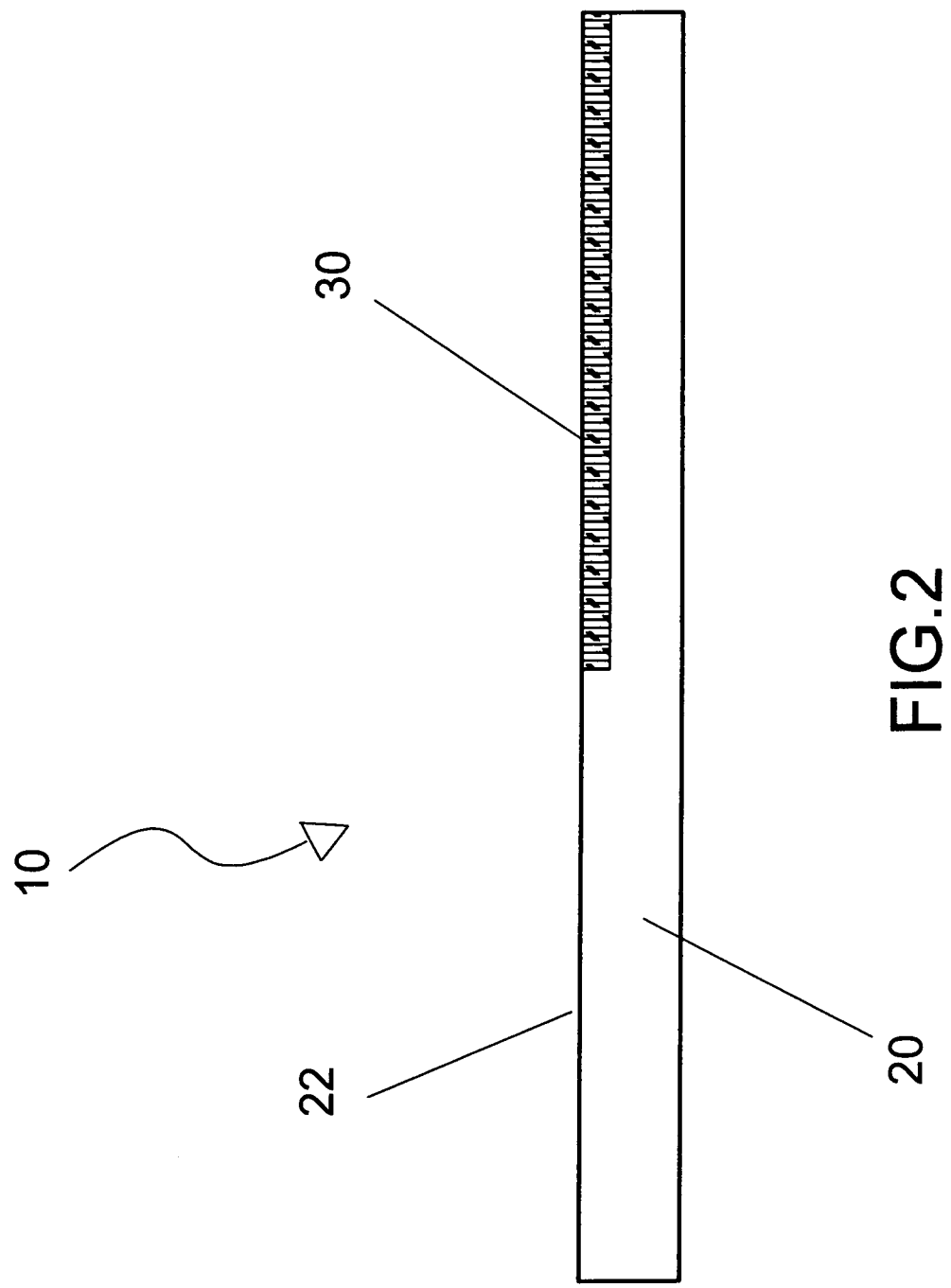
FIG. 2 is a side elevational view thereof.

The best mode for carrying out the invention is presented in terms of its preferred embodiment, herein depicted within the Figures. In the following detailed description of a preferred embodiment of the present invention, reference is made to the accompanying drawings which, in conjunction with this detailed description, illustrate and describe a preferred embodiment of a claw scratcher in accordance with the present invention. Referring now to the drawings, in which like-referenced characters represent corresponding elements throughout the several views, as shown in FIG. 1 and FIG. 2, a combination scratching structure or claw scratcher 10 is comprised of a base 20, where the base 20 is made of a low cost textured material such as corrugated fiberboard or corrugated cardboard 23. The combination scratching structures or claw scratcher 10 is further comprised of a cork-catnip composite material surface 30 which is affixed to the base 20 via bonding, adhesion or similar process known to one skilled in the art. The textured surface 22 is created by the exposed portion of the base 20.

Figure 3:
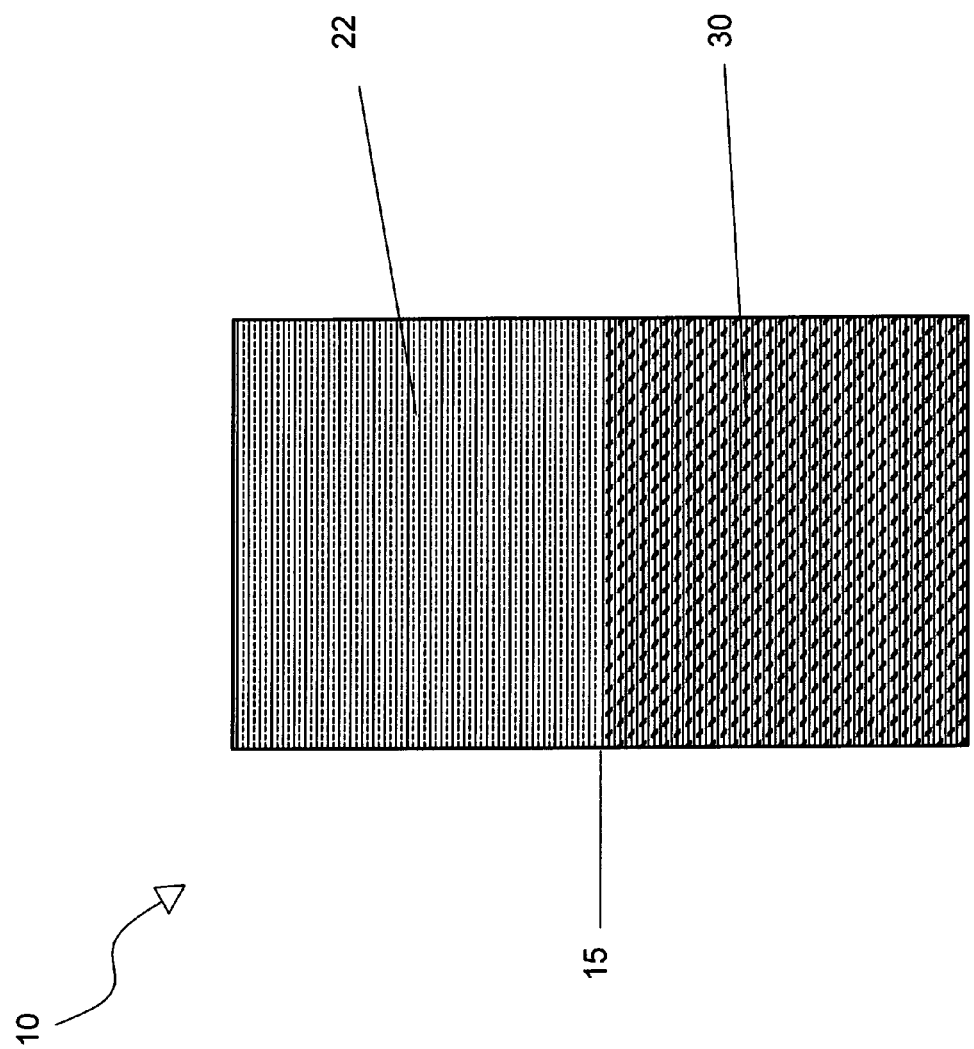
FIG. 3 is a top plan view thereof, depicting the scratching surface.

FIG. 3 is a top plan view of the combination claw scratcher 10 showing the scratching surface 15 comprised of the textured surface 22 and the cork-catnip composite material surface 30. The combination of the textured surface 22 and the cork-catnip composite material surface 30 increases the attractiveness of the product to the domestic pet.

The cork-catnip composite material forming the surface 30 is described in further detail in the related reference U.S. Ser. No. 13/929,851 in the name of the present inventor and incorporated by reference as if fully rewritten herein. The cork-catnip composite material is formed of a solid attractant, a lignocellulose fiber material and a binging agent. It is anticipated that other additives may be incorporated to accommodate particular uses or design choices, such as the incorporation of dyes in order to provide colors for otherwise alter the aesthetic of the final article. Other functional additives such as odor absorbing materials, can further be incorporated into the agglomerated finished composite material. Such as odor absorbing materials which may include bentonite, zeolite, or other clays or odor absorbent materials.

The solid attractant is preferably a dried and granulated catnip. It should be obvious to a person having ordinary skill in the relevant art, in light of the present teachings, that equivalent replacements for dried and granulated catnip can be utilized, including by not limited to, any plant containing a terpenoid nepetalactone or similar chemical to the essential oil of *Nepeta cataria* and other species with the genus Nepeate, as well as other plants that are known to have effects on cats, including valerian (*Valeriana officinalis*) and plants that contain actinidine.

The lignocellulose filler material is preferably granulated or agglomerated cork. Cork is commercially harvested from the bark tissue of the Cork Oak (i.e. *Quercus suber*). While a majority of the cork harvest is used each year in the manufacture of wine bottle stoppers and other closures, for the purpose of the present invention it is intended that less value added waste streams from such production be re-purposed. As such, it is intended that flaked, chipped ground, agglomerate or manufacturing "dust" from other cork manufacturing processes are to be sources and reused as the filler material of the present invention. To date, such "powder" created from grinding or cutting in cork manufacturing has been in boilers for steam and energy production.

It should be obvious to a person having ordinary skill in the relevant art, in light of the present teachings, that equivalent replacements for ground or agglomerated cork can be utilized, including, but not limited to, any plant containing lignocellulose such as, by way of example and not meant as a limitation, sawdust, wood chips, wood pellets or wood shavings of any type, such as cedar, pine or the like, as well as various woody biomass materials. The use of cedar or pine is preferred as an alternative material in that these all-natural materials are already utilized in domestic pet products, such as for use in cat litter or small animal bedding and their use is generally accepted by both pets and pet owners.

The binding agent can be a lignosulfate binder, which has been found to be an effective bonding agent for both dried and ground catnip as well as for cork. Other effective bonding agents are known and can be used, such as, various thermoplastic resins and polyurethane food grade adhesives.

As described in the present invention, a catnip-cork composite material is provided that is capable of being molded, compressed, extruded or similarly processed into small or large sheets and allow for the economic manufacture of products for domestic pets, especially felines. As described above, a low cost, all-natural (or substantially natural) composite material can be formed economically into various shapes, and its anticipated use herein is as a planar sheet forming the scratching and attractant surface 30.

2. Operation of the Preferred Embodiment

Figure 4:
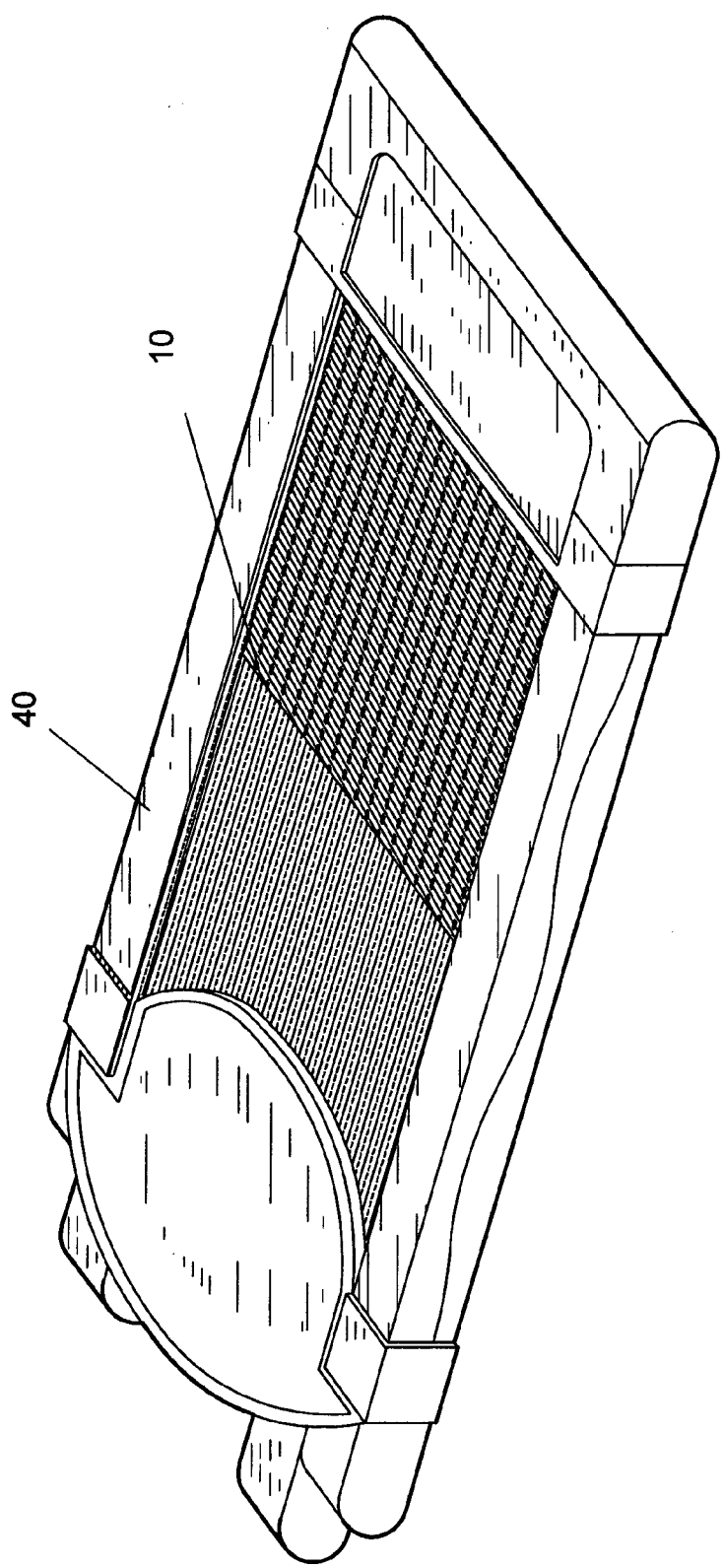
FIG. 4 is a domestic cat scratcher incorporating the combination claw scratcher according to one preferred embodiment of the present invention.

In accordance with a preferred embodiment of the present invention, as shown in conjunction with FIG. 4, an exemplary design for a domestic cat scratcher is shown incorporating the composite material according to the preferred embodiment of the present invention. The cork-catnip composite material can be affixed as a functional surface element. This preferred embodiment of the present invention has functional scratching surface 15 with an exposed corrugated cardboard element providing the textured surface 22 and a cork-catnip composite material surface 30.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A small animal claw scratching apparatus comprising:
   a base forming a support and an upper surface, wherein said base is corrugated fiberboard or corrugated cardboard; and
   a first textured material affixed to or forming at least a portion of said upper surface; and
   a second textured surface comprising a composite material surface and attached to at least a portion of said upper surface, wherein the composite material surface comprises:
   a solid attractant;
   a lignocellulose filler material; and
   a binding agent;
   wherein said composite material provides sufficient delivery of an aromatic olfactory attractant to be effective in having an interactive response with a domestic feline.

2. The small animal claw scratching apparatus of claim 1, wherein said solid attractant is selected from the group consisting of: dried and granulated catnip, any plant containing a terpenoid nepetalactone or similar chemical to the essential oil of *Nepeta cataria*, other species within the genus *Nepeta*, other plants that are known to have effects on cats, valerian (*Valeriana officinalis*), and plants that contain actinidine.

3. The small animal claw scratching apparatus of claim 2, wherein said lignocellulose filler material is selected from the group consisting of: granulated or agglomerated cork; sawdust, wood chips, wood pellets, and wood shavings of cedar; and sawdust, wood chips, wood pellets, and wood shavings of pine.

4. The small animal claw scratching apparatus of claim 1, wherein said lignocellulose filler material is selected from the group consisting of: granulated or agglomerated cork; sawdust, wood chips, wood pellets, and wood shavings of cedar; and sawdust, wood chips, wood pellets, and wood shavings of pine.

5. The small animal claw scratching apparatus of claim 1, wherein said solid attractant comprises between about 10% to about 60% of the overall composition, by weight.

6. The small animal claw scratching apparatus of claim 1, wherein said filler material comprises between about 80% to about 20% of overall composition, by weight.

7. The small animal claw scratching apparatus of claim 1, wherein said binding agent comprises about 20% or less of the overall composition, by weight.

8. The small animal claw scratching apparatus of claim 1, wherein said binding agent is selected from the group consisting of: food grade polyurethanes, dextrin, casein, gelatin, urea-formaldehyde, amine, urethane resins, melaminic resins, phenolic resins, and lignosulfate binders.

9. The small animal claw scratching apparatus of claim 1, wherein said filler material is selected from the group consisting of: granulated or agglomerated cork; sawdust, wood chips, wood pellets, and wood shavings of cedar; sawdust, wood chips, wood pellets, and wood shavings of pine; calcium carbonate; calcite; bentonite; zeolite; and other clay materials.

10. The small animal claw scratching apparatus of claim 1, further comprising the incorporation of dyes in order to provide colors or otherwise alter the aesthetic of the final article.

\* \* \* \* \*